United States Patent Office 3,450,495
Patented June 17, 1969

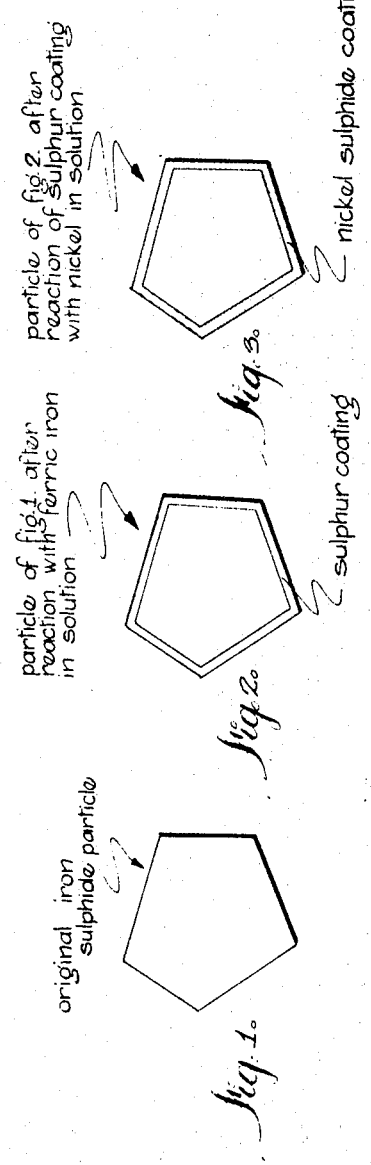

3,450,495
METHOD OF PRECIPITATING METALS AS SULPHIDES
Philip G. Thornhill, Richmond Hill, Ontario, and Edward H. Coulter, Willowdale, Ontario, Canada, assignors to Falconbridge Nickel Mines Limited, Thornhill, Ontario, Canada
Filed Sept. 16, 1966, Ser. No. 580,043
Int. Cl. C01g 3/12; C22b 23/00
U.S. Cl. 23—135    5 Claims

ABSTRACT OF THE DISCLOSURE

A method of precipitating a dissolved metal value from a solution containing ferric ions and a dissolved metal value such as nickel, cobalt or copper. Elemental sulfur is generated in the solution by mixing therein iron sulfide particles to reduce the ferric ions to ferrous ions and simultaneously generate a coating of elemental sulfur on the surfaces of the particles. Subsequently metallic iron is mixed into the solution and the dissolved metal value reacts with elemental sulfur and metallic iron to form a metal sulfide on the surfaces of the particles.

---

This invention relates to the recovery of metals from solutions and more particularly to methods for the recovery of metals such as nickel, cobalt, and copper from solutions containing iron by precipitation of these metals as sulphides.

The precipitation of nickel sulphide has been effected in the past by reacting the nickel-containing solution with iron sulphide in the presence of metallic iron. The iron sulphide could be added directly to the solution or formed in situ by reaction between elemental sulphur and metallic iron but in either case precipitation proceeded according to the reaction, $$NiSO_4 + FeS \rightarrow NiS + FeSO_4 \qquad (1)$$

It is evident from Equation 1 that the stoichiometric requirement of sulphur is only one atom or about 0.5 weight units per atom or weight unit of nickel. In prior practice as much as 23 weight units of sulphur have been required per weight unit of nickel, however, or about 44 times the stoichiometric quantity. In addition to this gross inefficiency, a further disadvantage of the prior practice is that it cannot be extended to metal values other than nickel. For example, it cannot be extended to cobalt because the cobalt remains in solution.

In United States Patent 3,103,414 to Thornhill, assigned to Falconbridge Nickel Mines Limited, an explanation is given that the poor efficiency of the method described above is due to the low thermodynamic potential of reaction (1), indicated by an exothermic heat of reaction of only 4 kilocalories per gram atom of nickel. It is also pointed out in the patent that if the iron and sulphur required for precipitation are added to the solution in elemental form and can be prevented from reacting together to form iron sulphide before reacting with and precipitating the dissolved nickel, then the precipitation will proceed according to the following reaction, $$NiSO_4 + Fe + S \rightarrow NiS + FeSO_4 \qquad (2)$$

The heat liberated by this reaction is 26 kilocalories per gram atom of nickel, more than six times that of reaction (1) and indicative of a correspondingly greater thermodynamic potential. The method described in the aforementioned patent involves a separate pretreatment of sulphur particles in a solution of an alkali metal sulphide, for example sodium sulphide, to coat the surfaces of the sulphur particles. The coated sulphur particles and metallic iron are then added to the nickel solution and immediately upon contact the sodium sulphide reacts with a corresponding amount of dissolved nickel to form layers of nickel sulphide on the surfaces of the sulphur particles according to the following reaction, $$Na_2S + NiSO_4 \rightarrow NiS + Na_2SO_4 \qquad (3)$$

Direct contact and consequent reaction between the sulphur and iron particles is thereby prevented and further precipitation of nickel sulphide occurs presumably by diffusion of nickel ions and electrons through the NiS layer thereby moving the NiS–S interface inward toward the core of the sulphur particle until precipitation is complete. By such a method consumption of reagents is decreased to about 1.0 weight unit of sulphur per weight unit of nickel or 4.5 weight units of iron plus sulphur per weight unit of nickel. Thus only about twice the stoichiometric quantity of sulphur is used but in addition the method has the further advantage that cobalt in solution is also precipitated.

It will be clear upon consideration of the above reactions, however, that if ferric iron exists in the solutions when iron and sulphur additions are made for precipitation of the dissolved nickel, either iron will be consumed in the reduction of the ferric iron to ferrous iron or, at a pH above about 2.8, ferric iron will be precipitated as ferric hydroxide which has notoriously bad filtering properties. In the first case more iron must be used to precipitate the nickel than is required in the absence of ferric iron, thereby adding to reagent costs, and in the last case the nickel sulphide product is likely to be poorly filterable and in any event will be diluted and contaminated with unwanted ferric hydroxide. It is clearly desirable, therefore, to reduce ferric iron to ferrous iron prior to nickel precipitation to avoid the problems caused by precipitation of ferric hydroxide and the consumption of iron particles needed for nickel precipitation.

Thus Thornhill reacts his solution first with an excess of iron sulphide particles, which are cheaper than iron particles, and reduces ferric iron to the ferrous state. He then filters the reduced solution from residual iron sulphide before adding the iron and pretreated sulphur particles for nickel precipitation and thereby produces a relatively pure nickel sulphide precipitate uncontaminated with iron sulphide. The cost of this advantage is, however, that some solution, and consequently some nickel, remains in the iron sulphide filter cake and that in recovering this nickel by recirculation or by a separate treatment there is a greater overall nickel loss than would occur if the nickel were recovered directly.

Recently, in accordance with the present invention a method has been developed first to precipitate nickel from solutions containing ferric iron by means of metallic iron and elemental sulphur in a special form which precludes the need for pretreatment of the sulphur with sodium sulphide to avoid unwanted reaction between the iron and sulphur, and second to precipitate the nickel directly as a readily filterable nickel sulphide without precipitation of dissolved iron and without the necessity for any recirculation or separate recovery of a part of the nickel. Furthermore the nickel is precipitated with less than 2.5 weight units of iron plus sulphur per weight unit of nickel, or thereabouts, indicating an efficiency quite unrealized in the past. In addition cobalt and copper may also be precipitated advantageously by the same method. It will therefore be understood that when the method is described with respect to nickel, it will also apply to cobalt and copper.

Thus it is an object of the present invention to provide an improved process to precipitate as a sulphide a metal selected from the group consisting of nickel, cobalt and copper from solutions containing ions of the metal, sulphate ions and ferric ions without also precipitating the dissolved iron.

It is another object of the invention to accomplish the precipitation with improved efficiency of reagent utilization with reagents cheaply and readily available.

Another object of the invention is to precipitate from a solution nickel sulphide in a form which is readily filterable from the solution.

These and other objects and advantages will become apparent from the following description and the accompanying drawings, in which FIG. 1 is a schematized representation of an iron sulphide particle, FIG. 2 is a representation of the same particle as shown in FIG. 1 after partial reaction, with a solution containing ferric iron in which iron is leached away leaving the corresponding sulphur behind in situ as a layer on an iron sulphide core, and FIG. 3 is a representation of the same particle as shown in FIG. 2 after reaction with a solution containing ferrous iron and dissolved nickel in which the nickel reacts with the sulphur and is precipitated as a layer of nickel sulphide on the iron sulphide core.

Broadly speaking, the process as it relates to nickel comprises adding iron sulphide to solutions containing dissolved nickel and ferric iron, reacting the iron sulphide and ferric iron to reduce the latter to the ferrous state and generate sulphur in situ and then to add metallic iron and react it and the sulphur with the dissolved nickel to precipitate the latter as nickel sulphide.

The type of metallurgical solutions containing nickel to which the present invention is applicable are sulphate solutions which also contain dissolved iron in the ferric state. We have discovered that when finely divided iron sulphide is mixed with such solutions, not only is the ferric iron reduced to ferrous iron but it also appears sulphur is released in a highly reactive form. Moreover, the reactivity of the sulphur appears to be highly selective, greatly favouring elements such as nickel, cobalt and copper, while remaining substantially inert to metallic iron subsequently added to the mixture. Thus after treatment of the solution with iron sulphide, metallic iron is added to the system and nickel precipitated by reaction of elemental sulphur and metallic iron with the dissolved nickel, according to reaction (2). It is an important factor that the sulphur generated apparently remains substantially inert to the metallic iron subsequently added, thereby avoiding the unwanted reaction between iron and sulphur.

A test was made to determine the quantity of sulphur generated on reduction of ferric iron in solution with iron sulphide. In this test a metallurgical solution was analyzed and found to contain metals as sulphates with the following concentrations in gms. per litre.

Ni _____ 18.20
Fe³⁺ _____ 30.7
Fe³⁺ _____ 4.2
pH _____ 1.25

A finely divided pyrrhotite concentrate, which contained 13 wt. percent moisture, was dried, washed with carbon disulphide, $CS_2$, and found to contain 1.1 wt. percent elemental sulphur on a dry basis. Two litres of the above solution were mixed with 200 gm. of this wet pyrrhotite which, on the basis of the above analysis, contained 1.9 gm. S. The mixture of solution and pyrrhotite particles, 90 percent of which were −325 mesh in size, was agitated at 70° C. for 1½ hr. after which the spent pyrrhotite was filtered from the solution, dried, a portion washed with $CS_2$ to determine its sulphur concentration, and the whole found by calculation on the basis of this analysis to contain 13.5 gm. S. The sulphur generated by the reduction was therefore 11.6 gm. while the ferrous iron analysis of the solution increased to 35.7 gm./litre.

From the above data and the fact that iron and sulphur were present in the pyrrhotite in a ratio conforming to the approximate formula $FeS_{1.14}$, it appears that the reduction proceeded according to the reaction, $$Fe_2(SO_4)_3 + FeS_{1.14} \rightarrow 3FeSO_4 + 1.14S \quad (4)$$

The amount of sulphur which should have been produced in the above test according to reaction (4) is 13.8 gm., in reasonable agreement with the amount actually dissolved by the $CS_2$.

During reduction it appears the pyrrhotite particles are attacked by the solution, iron is leached out, and the sulphur formerly associated with the iron as iron sulphide is left behind as coatings on the pyrrhotite cores. The highly efficient utilization of the sulphur in precipitation is an indication of its highly reactive nature. Thus, upon addition of metallic iron to the mixture of solution and pyrrhotite after reduction, nickel is precipitated with consumption of less than 0.5 gm. S per gm. Ni, less than half the sulphur needed in the process described above in which sodium sulphide is used.

Reduction of the ferric iron in solution is accomplished with iron sulphide which for purposes of the present application is intended to include not only the complete range of pyrrhotites, whose compositions vary between FeS and $FeS_{1.22}$, but also sulphide concentrates which in addition to iron sulphide contain other sulphides such as, for example, nickel sulphide and copper sulphide. The use of such concentrates is advantageous, in fact, because as a result of the reduction and precipitation stages the concentrates are depleted in iron and upgraded in nickel.

Temperature is important only to the extent that it affects kinetics. At temperatures below about 50° C., for example, reaction rates are impracticably low while evaporation and heat losses are excessive above about 90° C. Most satisfactory results have been obtained in the approximate range 70–80° C. but practice of the process is not limited to this range.

The pH of the solution is important only to the extent that it be above or below certain values. During reduction, for example, the only limitation on pH is that it be below about 2.8 to prevent precipitation of ferric hydroxide. Sulphide precipitation on the other hand, can be carried out at pH below 5 or thereabouts but at higher values ferrous iron, nickel, cobalt and copper are precipitated as hydroxides. Such hydroxides are generally unfilterable, however, and therefore undesirable.

Good separability of the sulphide precipitate from the barren solution by means of filtering or settling is an important advantage from a practical point of view and is readily effected according to the present method by the simple expedient of using iron sulphide particles or other sulphide concentrate particles containing iron sulphide for reduction which are themselves readily filterable. A possible reason for the success of this measure is suggested in the attached drawings in which all the particles are shown the same size and shape thereby implying that the net effect of the method on the sulphide particles is simply the replacement of iron with nickel in a surface layer. Thus the product sulphide particles is substantially as filterable as the inital sulphide particle and therefore if the initial sulphide particles are themselves a filter cake material the resulting product particles are readily separable from the barren solution also by filtering.

Another important contributing factor to good separability in the present case is the density of the product. It will be recalled that in the method described in the aforementioned United States Patent 3,103,414, nickel sulphide is precipitated on a sulphur core. In the present invention the sulphide material is precipitated on a denser core of iron sulphide. Because the specific gravity of sulphur is about 2 while that of iron sulphide is about 5, it will be apparent to those skilled in the art that other things being equal iron sulphide particles would settle more readily than sulphur particles and therefore the product obtained by the method of this invention is more separable than that of the product obtained from prior art methods.

The practice of the present process is illustrated by the following examples.

Example 1

A metallurgical solution was analyzed and found to contain metals as sulphates with the following concentrations in gm. per litre,

| | |
|---|---|
| Ni | 20 |
| $Fe^{3+}$ | 35 |
| $Fe^{2+}$ | 5 |

One litre of this solution was treated with 69 gm. of a readily filterable sulphide material which contained 50 gm. pyrrhotite, $FeS_{1.14}$, and after agitating for 3 hours at 70° C. the solution contained in gm. per litre,

| | |
|---|---|
| Ni | 19.7 |
| $Fe^{3+}$ | 1.0 |
| $Fe^{2+}$ | 37 |

Thus 32 gm. of $Fe^{2+}$ were produced while the $Fe^{3+}$ concentration was decreased by 34 gm./litre. The apparent discrepancy was due to the precipitation of basic iron sulphate in which iron is present in the ferric state. The sulphur which should be generated theoretically with the production of 32 gm. of $Fe^{2+}$ by the reduction of $Fe^{3+}$ with $FeS_{1.14}$ was calculated to be 7.0 gm. Half the slurry, or 500 cc., was analyzed for elemental sulphur by the $CS_2$ leach method and found to contain 3.4 gm., equivalent to a concentration of 6.8 gm./litre, in good agreement with theory. To the other 500 cc. of slurry was added 17 gm. mild steel turnings, equivalent to 34 gm./litre Fe, and after agitation of the slurry for 2.5 hours at 70° C. the solution was analyzed and found to contain only 0.16 gm./litre Ni.

Thus 99.2% of the dissolved nickel was precipitated by reaction of only 0.35 gm. S per gm. Ni and 1.73 gm. Fe per gm. Ni or a total of only 2.1 gm. Fe+S per gm. Ni.

Example 2

This is an illustration of the application of the present process on a plant scale. This example shows precipitation of nickel, cobalt and copper. The analyses of the solids and the sulphate solutions are tabulated below.

| | Solution, gm/litre | | | | | | |
|---|---|---|---|---|---|---|---|
| | $Fe^{3+}$ | $Fe^{2+}$ | Ni | Co | Cu | $Al_2O_3$ | pH |
| Pregnant | 39.0 | 6.0 | 20.0 | 0.5 | 1.9 | 8.0 | 0.8 |
| Reduced | 2.0 | 46.0 | 19.0 | 0.5 | 1.8 | 7.6 | 1.0 |
| Barren | Nil | 80.0 | 0.5 | Nil | Nil | 0.6 | 2.6 |

| | Solids, wt. percent | | | | | |
|---|---|---|---|---|---|---|
| | Fe | S | Ni | Co | Cu | $SiO_2$ |
| Concentrate | 55.1 | 36.1 | 3.07 | 0.10 | 1.24 | 2.5 |
| Precipitate | 29.8 | 26.0 | 10.90 | 0.31 | 1.61 | 2.1 |

The sulphide concentrate used for reduction was a filter cake material which contained about 90% pyrrhotite and 3.07% Ni. This concentrate and the pregnant solution were fed at a rate of 160 lb. concentrate per 100 imp. gals. of solution into the first of a series of 4 agitated reduction tanks maintained at about 80° C. by steam injection. Retention time in each tank was about 2 hrs. The analysis of the slurry from the fourth tank is indicated above as "reduced." The slurry from the fourth tank was fed continuously with iron borings at a rate of 1.8 per lb. dissolved Ni to the first of another series of four tanks of the same size, each controlled to about 70° C. About 98% of the nickel, cobalt, and copper was precipitated and the solids up-graded to about 11% nickel and readily separated from solution by filtering. The amount of sulphur generated with the production of 40 gm./litre ferrous iron was calculated to be 8.7 gm./litre or 0.46 gm. S per gm. Ni in solution. Precipitation was effected, therefore, with only 2.26 gm. Fe+S per gm. Ni.

The reasons for the remarkable efficiency of the process are not known but appear to be associated with the two unique features of the treatment, (i) The sulphur used for precipitation is generated in situ during the reduction of ferric iron in solution by iron sulphide, (ii) The addition of sulphur and iron to the solution is accomplished in what amounts to two stages in that only after the sulphur is generated by reduction is iron added for precipitation of the metal values.

Also, it appears that sulphur generated according to the method of the present invention is not only highly reactive relative to sulphur flour and the like used in prior processes but is also highly selective to nickel, cobalt and copper with respect to iron.

In the preceding description, reasons have been suggested as a possible explanation to the functioning of the present invention. The suggested explanation may or may not be correct, nevertheless the method according to the invention provides an improved method for precipitating a metal, such as nickel, cobalt or copper from solutions with unexpected and advantageous results.

We claim:

1. In the method of precipitating dissolved metal values from a solution containing ferric ions and dissolved metal values selected from the group comprising nickel, cobalt and copper by reacting the solution with iron and sulfur and precipitating metal values as metal sulfide, the improvement comprising:

first generating elemental sulfur in contact with the solution and out of contact with metallic iron by mixing iron sulfide particles into the solution and reducing ferric ions to ferrous ions by reaction of the solution with the particles, thereby forming a reduced solution and simultaneously generating elemental sulfur on the surfaces of the particles, and subsequently precipitating the metal values by mixing metallic iron into the mixture of reduced solution and sulfur-coated particles and reacting dissolved metal values, metallic iron and elemental sulfur together and forming metal sulfide on the surfaces of the particles.

2. The method of claim 1 and further including the step of maintaining the pH of the solution below about 2.8 to prevent precipitation of ferric oxide during the step of reducing the ferric ions to ferrous ions.

3. The method of claim 1 in which the metal is nickel and the precipitated metal value is nickel sulphide.

4. The method of claim 1 in which the metal is cobalt and the precipitated metal value is cobalt sulphide.

5. The method of claim 1 in which the metal is copper and the precipitated metal value is copper sulphide.

References Cited

UNITED STATES PATENTS

| 1,333,688 | 3/1920 | Sulman et al. | 23—135 X |
| 2,755,172 | 7/1956 | McGauley et al. | 23—135 X |
| 2,757,080 | 7/1956 | De Merre | 75—108 X |
| 3,103,414 | 9/1963 | Thornhill | 23—134 X |
| 3,232,742 | 2/1966 | Zimmerly | 75—108 X |

OSCAR R. VERTIZ, *Primary Examiner.*

G. O. PETERS, *Assistant Examiner.*

U.S. Cl. X.R.

75—119

PO-1050
(5/69)

UNITED STATES PATENT OFFICE
CERTIFICATE OF CORRECTION

Patent No. 3,450,495      Dated June 17, 1969

Inventor(s) Philip G. Thornhill and Edward H. Coulter

It is certified that error appears in the above-identified patent and that said Letters Patent are hereby corrected as shown below:

Column 3, line 57, which reads "$Fe^{3+}$ ---------- 4.2" should read -- $Fe^{2+}$ ---------- 4.2 --.

SIGNED AND SEALED

OCT 28 1969

(SEAL)
Attest:

Edward M. Fletcher, Jr.
Attesting Officer

WILLIAM E. SCHUYLER, JR.
Commissioner of Patents